United States Patent
Mayr

(10) Patent No.: US 8,862,334 B2
(45) Date of Patent: Oct. 14, 2014

(54) VEHICLE HAVING A DEVICE FOR SETTING AN OPEN POSITION OF AN UPWARDLY PIVOTABLE TAILGATE, AND A METHOD OF OPERATING THE VEHICLE

(71) Applicant: Bayerische Motoren Werke Aktiengesellschaft, Munich (DE)

(72) Inventor: Juergen Mayr, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 51 days.

(21) Appl. No.: 13/752,558

(22) Filed: Jan. 29, 2013

(65) Prior Publication Data

US 2013/0144494 A1 Jun. 6, 2013

Related U.S. Application Data

(63) Continuation of application No. PCT/EP2011/062487, filed on Jul. 20, 2011.

(30) Foreign Application Priority Data

Aug. 5, 2010 (DE) .......................... 10 2010 038 967

(51) Int. Cl.
*G06F 17/00* (2006.01)
*E05F 15/20* (2006.01)
*B60G 17/017* (2006.01)

(52) U.S. Cl.
CPC ............... *G06F 17/00* (2013.01); *E05F 15/20* (2013.01); *B60G 2800/204* (2013.01); *B60G 2400/95* (2013.01); *E05Y 2900/546* (2013.01); *B60G 2300/38* (2013.01); *B60G 2800/203* (2013.01); *B60G 17/017* (2013.01); *B60G 2400/952* (2013.01); *B60G 2500/30* (2013.01)

USPC .................. 701/48; 701/36; 701/37; 701/45; 701/49

(58) Field of Classification Search
CPC ......... B60K 41/00; B62D 25/10; B62D 25/12
USPC .................................... 701/36, 37, 45, 48, 49
See application file for complete search history.

(56) References Cited

U.S. PATENT DOCUMENTS 4,477,874 A * 10/1984 Ikuta et al. ...................... 701/49
5,466,007 A * 11/1995 Smith .......................... 280/6.157

(Continued)

FOREIGN PATENT DOCUMENTS

CN 101010477 A 8/2007
CN 101094773 A 12/2007

(Continued)

OTHER PUBLICATIONS

International Search Report dated Oct. 19, 2011 w/English translation (four (4) pages).

(Continued)

*Primary Examiner* — Thomas G Black
*Assistant Examiner* — Sara Nelson
(74) *Attorney, Agent, or Firm* — Crowell & Moring LLP

(57) ABSTRACT

A vehicle has a device for setting an open position of a tailgate, which can be pivoted upwards and, after an opening command to a first control unit, can be adjusted into a predefined open position via an adjusting device. The vehicle has a device for setting a predefined vehicle height, which device includes a second control unit for actuating an active wheel suspension system. Lowering of the vehicle height is performed at the same time as the opening of the tailgate, by way of a communications link between the first control unit and the second control unit and by way of corresponding programming of at least one of the two control units. The simultaneous opening of the tailgate and lowering of the vehicle height are prevented if a blocking command for this function is present in one of the two control units.

13 Claims, 1 Drawing Sheet

(56) References Cited

U.S. PATENT DOCUMENTS

| | | | |
|---|---|---|---|
| 5,517,847 A * | 5/1996 | Campbell et al. | 73/11.07 |
| 6,098,994 A * | 8/2000 | Kunishima et al. | 280/5.514 |
| 6,282,470 B1 * | 8/2001 | Shono et al. | 701/37 |
| 8,228,166 B2 | 7/2012 | Eberhard | |
| 2002/0079626 A1 | 6/2002 | Grotendorst et al. | |
| 2003/0231131 A1 * | 12/2003 | Dimig et al. | 341/176 |
| 2008/0296929 A1 * | 12/2008 | Suzuki et al. | 296/146.9 |
| 2009/0000368 A1 | 1/2009 | Pruckner | |
| 2009/0062985 A1 * | 3/2009 | Ohashi et al. | 701/37 |
| 2009/0184480 A1 | 7/2009 | Larsson et al. | |
| 2010/0168961 A1 * | 7/2010 | Messih et al. | 701/38 |

FOREIGN PATENT DOCUMENTS

| | | |
|---|---|---|
| DE | 195 25 835 A1 | 1/1997 |
| DE | 10 2008 006 849 A1 | 8/2009 |
| DE | 10 2008 011 637 A1 | 9/2009 |
| EP | 1 216 860 A2 | 6/2002 |
| EP | 1 997 660 A2 | 12/2008 |
| JP | 11-198625 A | 7/1999 |
| WO | WO 2007/104393 A1 | 9/2007 |

OTHER PUBLICATIONS

German-language Office Action dated Mar. 15, 2011 (five (5) pages).
Chinese Office Action dated Aug. 5, 2014, with English translation, (8 pages).

\* cited by examiner

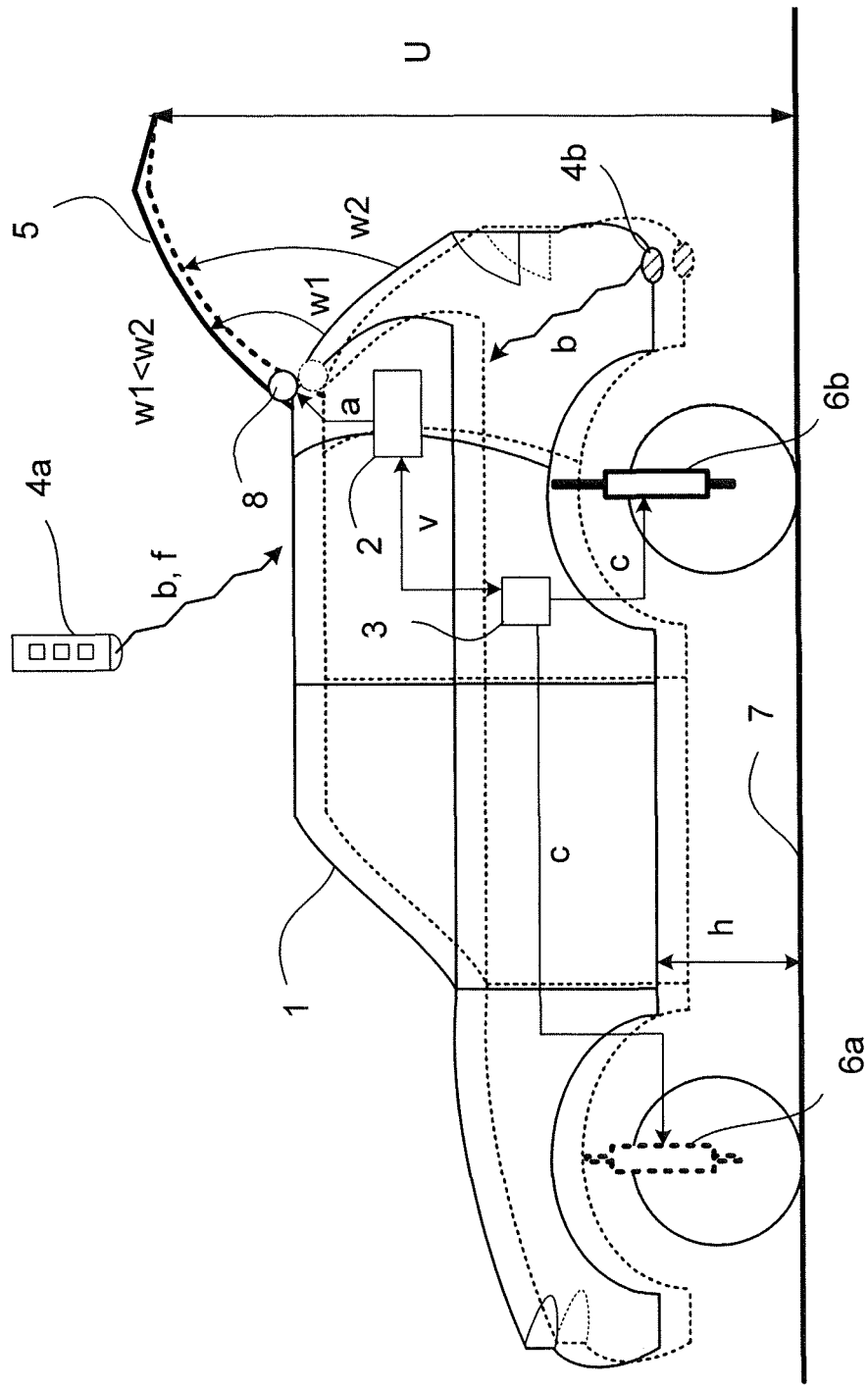

VEHICLE HAVING A DEVICE FOR SETTING AN OPEN POSITION OF AN UPWARDLY PIVOTABLE TAILGATE, AND A METHOD OF OPERATING THE VEHICLE

CROSS REFERENCE TO RELATED APPLICATIONS

This application is a continuation of PCT International Application No. PCT/EP2011/062487, filed Jul. 20, 2011, which claims priority under 35 U.S.C. §119 from German Patent Application No. DE 10 2010 038 967.6, filed Aug. 5, 2010, the entire disclosures of which are herein expressly incorporated by reference.

BACKGROUND AND SUMMARY OF THE INVENTION

The invention relates to a vehicle having a device for setting an open position of a tailgate which can be pivoted upwards, and a method of operating the vehicle.

German Patent document DE 10 2008 011 637 A1, for example, describes a device for setting an open position of a tailgate which can be pivoted upward. The tailgate, after the manual or motor-driven opening of a lock that locks the closed tailgate, can be adjusted to one preset open position and, by way of an operating device, can be adjusted to another open position.

It is an object of the invention to provide a device for setting an open position of a tailgate of a motor vehicle which can be pivoted upwards, and which prevents a collision with objects or persons as well as facilitates loading of the tailgate compartment.

This and other objects are achieved by a vehicle according to the invention having a device for setting an open position of a tailgate which can be pivoted upwards and which, upon an opening command to a first control unit, can be adjusted to a predefined open position by way of an adjusting device. Furthermore, the vehicle has a device for setting a predefined vehicle height, which comprises a second control unit for actuating an active wheel suspension system. By way of a communication connection between the first control unit and the second control unit and by way of a corresponding programming of at least one of the two control units, also a lowering of the vehicle height is carried out during the opening of the tailgate. This takes place either in a direct sequence, in which case first an opening of the tailgate and, subsequently, a lowering of the vehicle height is carried out, or, particularly advantageously in a simultaneous manner.

Preferably, the lowering of the vehicle height with an opening of the tailgate is prevented when a blocking command for this function is present in at least one of the two control units. As a result, electric energy may be saved, if necessary.

In a further aspect of the invention, the lowering of the vehicle height with an operating of the tailgate is prevented when a blocking command for this function is present in at least one of the two control units such that no activation signal for this function was output by a certain operating element. Such an operating element may, for example, be a key button of a remote control, a separate switch in the luggage compartment or a selectable menu item in a vehicle computer (such as the iDrive by BMW).

When the operating element is actuated for the output of the activation signal while the vehicle is not yet lowered, starting from an open position of the tailgate, a further opening of the tailgate preferably takes place by the amount by which, after the simultaneous or directly following lowering of the vehicle height, the same sheltering height is achieved as before the actuation of the operating element.

The invention is based on the following considerations. For example, from German Patent document DE 195 25 835 A1, a device is known for setting a vehicle height in the form of a wheel suspension control system for motor vehicles by defining a desired distance of a wheel from the vehicle body. However, wheel suspension control systems are basically more likely to be used for interventions controlling the driving dynamics.

By use of the existing wheel suspension control system, however, as a result of their multifunctional use, simultaneously with the opening of the tailgate, a lowering of the vehicle can be made possible. This facilitates loading, in particular of vehicles with a high loading edge.

The position of the loading edge is often too high, particularly in the case of comfortable sport utility vehicles (SUVs), especially when loading heavy objects, so that a loading can only be carried out with great effort and under ergonomically unfavorable conditions. A lowering of the vehicle, for example, by way of an active air suspension of a wheel suspension control system either only in the rear area, or completely, constitutes a remedy in this case. However, the lowering of the vehicle has the result that the head sheltering height under the open tailgate is also reduced. Therefore, preferably simultaneously with the lowering of the vehicle, the opening angle of the tailgate is increased in order to, for example, maintain or reset the original head sheltering height.

The simultaneous adjustment of the tailgate as well as of the vehicle height prevents an earlier increase of the opening angle from generating a collision risk in the upward direction, and a later increase of the opening angle from causing a risk of injury to the loading person.

After the loading of the luggage compartment, at least the raising of the vehicle can be initialized by way of a manual actuating device and the vehicle can be returned to its original height level. In addition or as an alternative, the raising of the vehicle height automatically takes place at the start of the drive, for example, with the start of the drive motor. In order to prevent risk of damage, for example, as a result of a collision with a garage ceiling, preferably the height of the previously increasingly opened tailgate will also be reduced again to the original value. This is ideally carried out again synchronously with the raising of the vehicle height. However, if the tailgate is closed manually before the vehicle is returned to the original vehicle height, the simultaneous automatic adjustment of the tailgate will not take place.

The above-described exemplary method according to the invention is preferably implemented by at least one corresponding program module in at least one control unit which is basically responsible in a known manner for the device for setting the tailgate and/or for the device for setting a predefined vehicle height by use of corresponding actuators and sensors. If several control units are used, these interact by use of corresponding communication modules.

Other objects, advantages and novel features of the present invention will become apparent from the following detailed description of one or more preferred embodiments when considered in conjunction with the accompanying drawing.

BRIEF DESCRIPTION OF THE DRAWING

The single drawing is a schematic view of an embodiment illustrating vehicle components for carrying out the above-described method.

DETAILED DESCRIPTION OF THE DRAWING

The drawing illustrates a motor vehicle 1 having a tailgate 5 which, in an open position with the opening angle w2, is indicated by broken lines and, in an open position with the opening angle w1, is indicated by solid lines. The motor vehicle 1 has a device, which is not shown here in detail, for setting an open position of a tailgate that is pivotable upwards and which, upon an opening command "b" to a first control unit 2, is adjustable to a predefined open position by way of an adjusting unit 8. Furthermore, the motor vehicle 1 has a device for setting a predefined vehicle height h, which may comprise a second control unit 3 for actuating an active wheel suspension system, here, for example with controllable pneumatic springs 6a on the front axle and 6b on the rear axle.

By way of a communication connection "v"—such as a data bus—between the first control unit 2 and the second control unit 3 and a corresponding programming of at least one of the two control units 2 or 3, a lowering of the vehicle height h is carried out preferably simultaneously with the opening of the tailgate 5. The control unit 2 actuates the adjusting device 8 for this purpose. The control unit 3 actuates the pneumatic springs 6b and possibly also 6a. According to an embodiment of the invention, a lowering of only the rear axle by way of the pneumatic springs 6b would also be sufficient, so that a lowering of the vehicle can also include merely lowering the vehicle rear end.

The simultaneous opening of the tailgate 5 and lowering of the vehicle height h is prevented when a blocking command for this function is present in one of the two control units 2 or 3 because of the fact that no activation signal f for this function was output by a certain operating element, here, for example, the remote control 4a. For this purpose, the remote control 4a may have its own key button.

A command b for opening the tailgate 5 may generally also be output by the remote control 4a, or by means of a proximity sensor 4b below the luggage compartment opening to be activated by swiveling a foot. The proximity sensor may wirelessly transmit a signal command to the control unit 2.

When the operating element 4a is actuated for the output of the activation signal f, starting from an open position of the tailgate 5 with an opening angle w1 when the vehicle 1 is not lowered (solid lines), a further opening of the tailgate 5 to a larger opening angle w2 takes place (broken lines) when the vehicle is lowered, by which the simultaneous lowering of the vehicle height results in the same sheltering height U as before the actuating of the operating element 4a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having an upwardly pivotable tailgate, the vehicle comprising:
    a first control unit by which the tailgate is adjustable into a predefined open position via an adjusting device;
    a second control unit by which an active wheel suspension system is activated to adjust a vehicle height, wherein
    a lowering of the vehicle height is carried out along with an opening of the tailgate via communication between the first control unit and the second control unit.

2. The vehicle according to claim 1, wherein the lowering of the vehicle height occurs simultaneously with the opening of the tailgate.

3. The vehicle according to claim 1, wherein the opening of the tailgate occurs first and is immediately followed by the lowering of the vehicle height.

4. The vehicle according to claim 1, wherein the lowering of the vehicle height with the opening of the tailgate is prevented when a blocking command for the lowering of the vehicle height is received in at least one of the first and second control units.

5. The vehicle according to claim 1, wherein the lowering of the vehicle height with the opening of the tailgate is prevented when a blocking command for the lowering of the vehicle height is received in at least one of the first and second control units based upon no activation signal for the lowering of the vehicle height having been output by a certain operating element.

6. The vehicle according to claim 5, wherein the certain operating element is at least one of a key button of a remote control, a switch in a luggage compartment area of the vehicle, and a selectable menu item in a vehicle computer.

7. The vehicle according to claim 5, wherein, in a case of an actuation of the certain operating element for outputting the activation signal while the vehicle is not yet lowered starting from an open position of the tailgate, an increased opening of the tailgate occurs by an amount such that, after the lowering of the vehicle height, a same sheltering height is achieved as was present before the actuation of the operating element.

8. A method of operating a vehicle having an upwardly pivotable tailgate, the method comprising the acts of:
    providing a first control unit capable of receiving an opening command to adjust the tailgate into a predefined open position;
    providing a second control unit for actuating an active wheel suspension system capable of setting a predefined vehicle height; and
    carrying out a lowering of the vehicle height along with an opening of the tailgate via communication between the first control unit and the second control unit.

9. The method according to claim 8, wherein the lowering of the vehicle height along with the opening of the tailgate are carried out simultaneously.

10. The method according to claim 8, wherein the act of carrying out the lowering of the vehicle height along with the opening of the tailgate further comprises the acts of:
    first, opening the tailgate; and
    immediately subsequently, lowering the vehicle height.

11. The method according to claim 8, further comprising the acts of:
    receiving a blocking command for blocking the lowering of the vehicle height along with the opening of the tailgate in at least one of the first and second control units; and
    preventing the lowering of the vehicle height along with the opening of the tailgate upon receipt of the blocking command.

12. The method according to claim 11, wherein the receipt of the blocking command occurs due to there being no activation signal output by an operating element.

13. The method according to claim 8, further comprising the acts of:
    actuating an operating element for outputting an activation signal for the lowering of the vehicle height when the vehicle has not yet been lowered with the tailgate in an open position;
    carrying out an increased opening of the tailgate by a defined amount such that, after simultaneous or immediately subsequent lowering of the vehicle height, a same sheltering height is achieved as was present before the actuation of the operating element.

* * * * *